Sept. 6, 1932. C. R. PALMER ET AL 1,875,757
THERMOMETER
Filed April 20, 1928 4 Sheets-Sheet 2
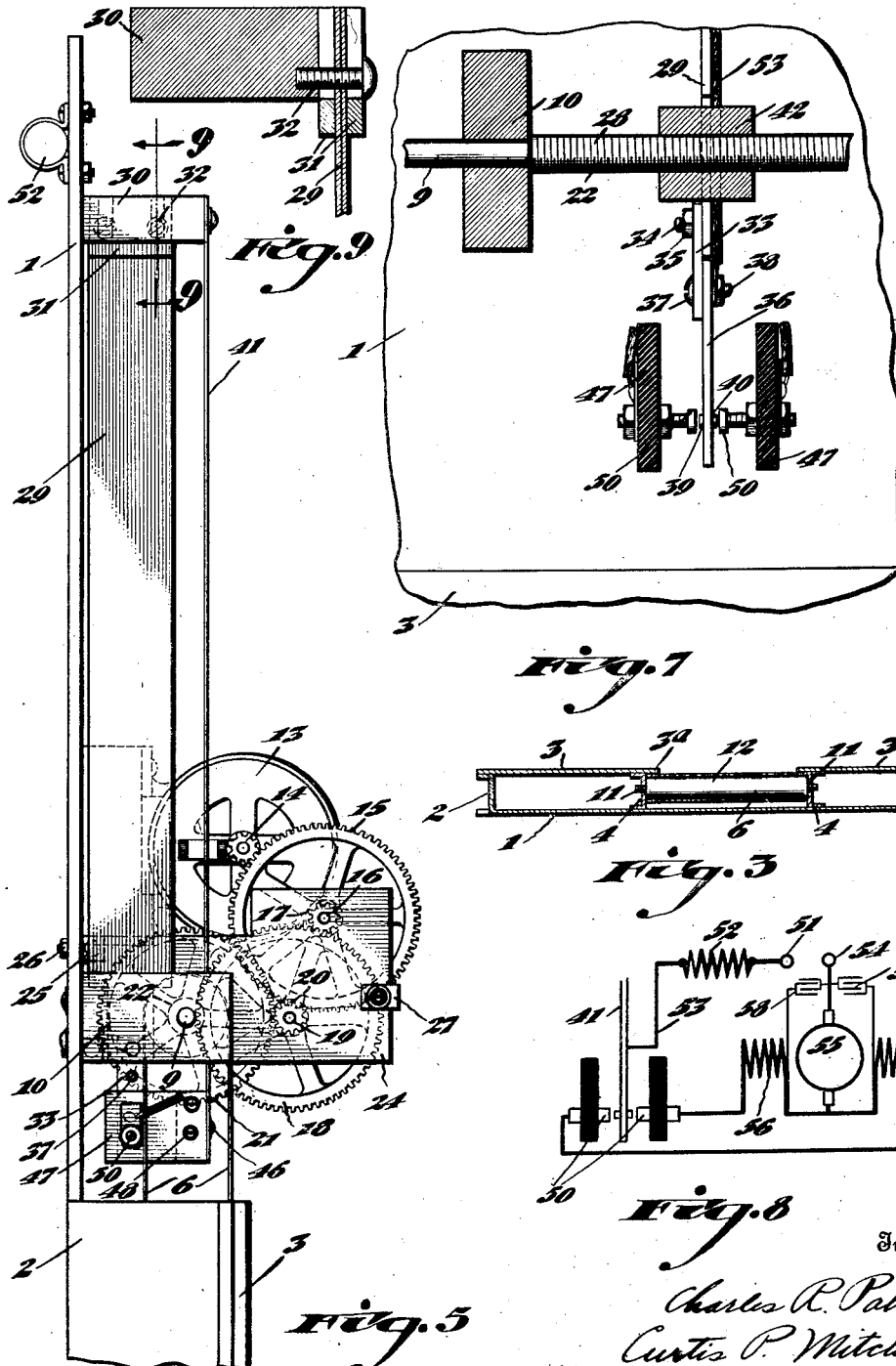

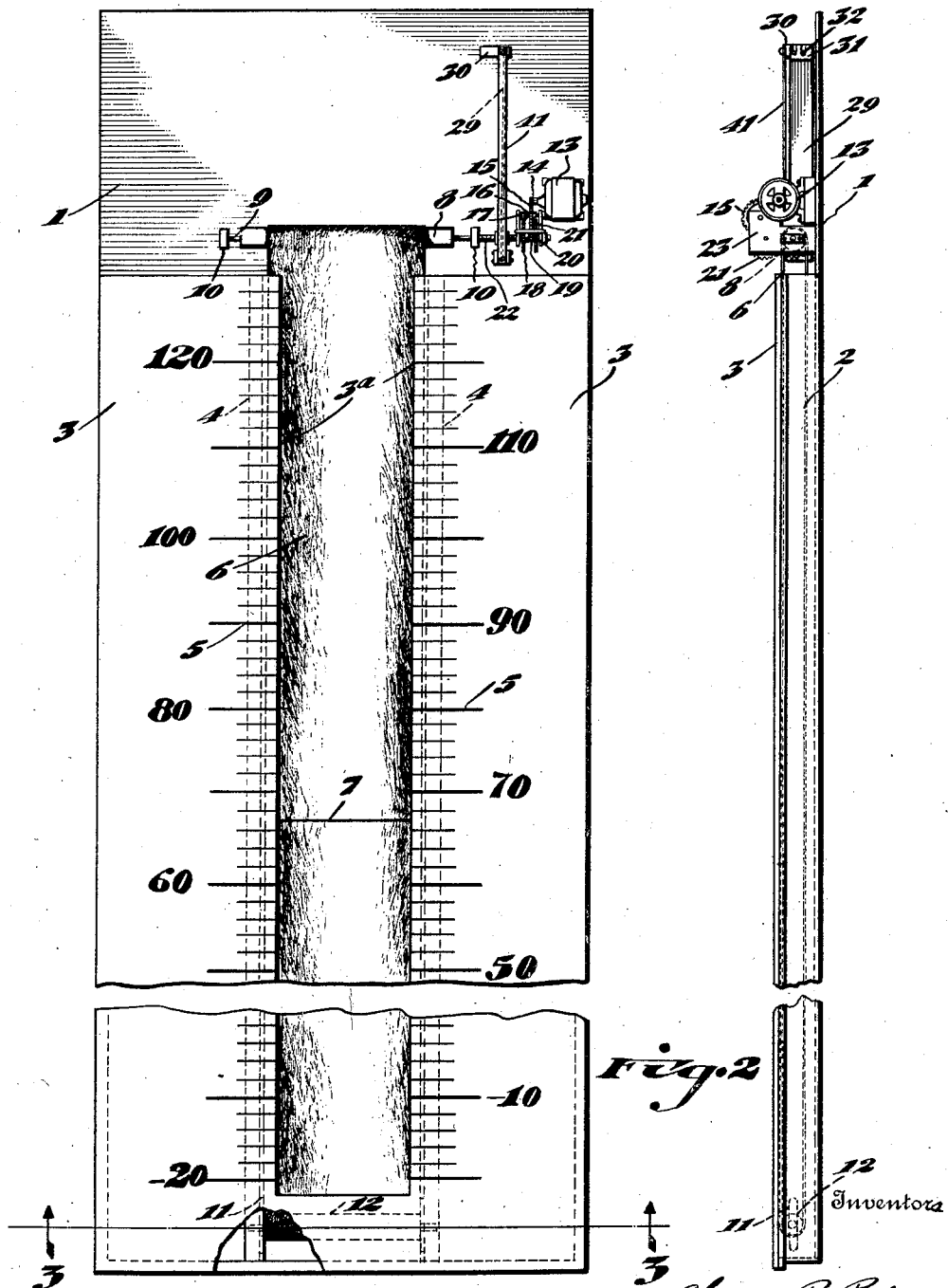

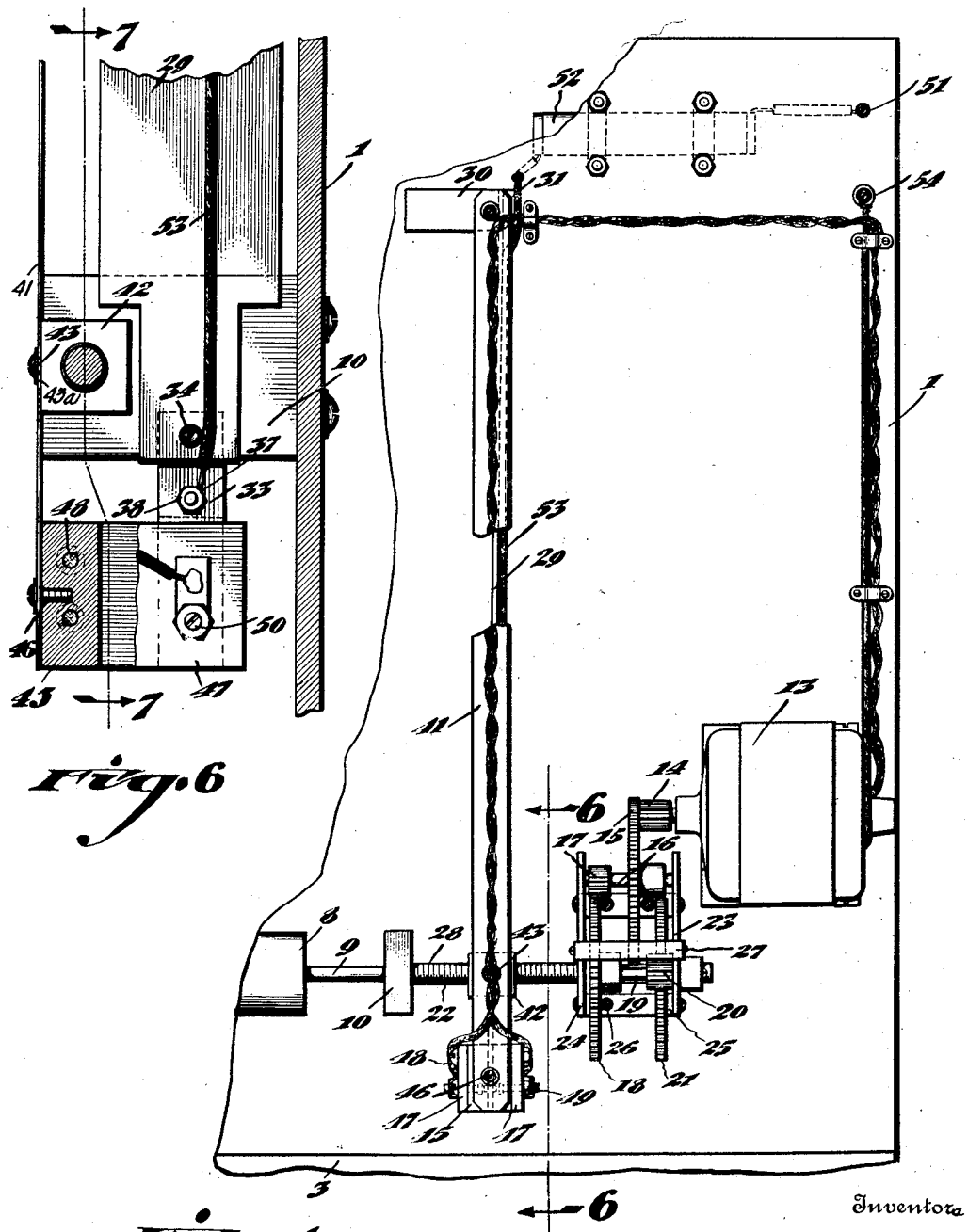

Sept. 6, 1932.    C. R. PALMER ET AL    1,875,757
THERMOMETER
Filed April 20, 1928    4 Sheets-Sheet 4
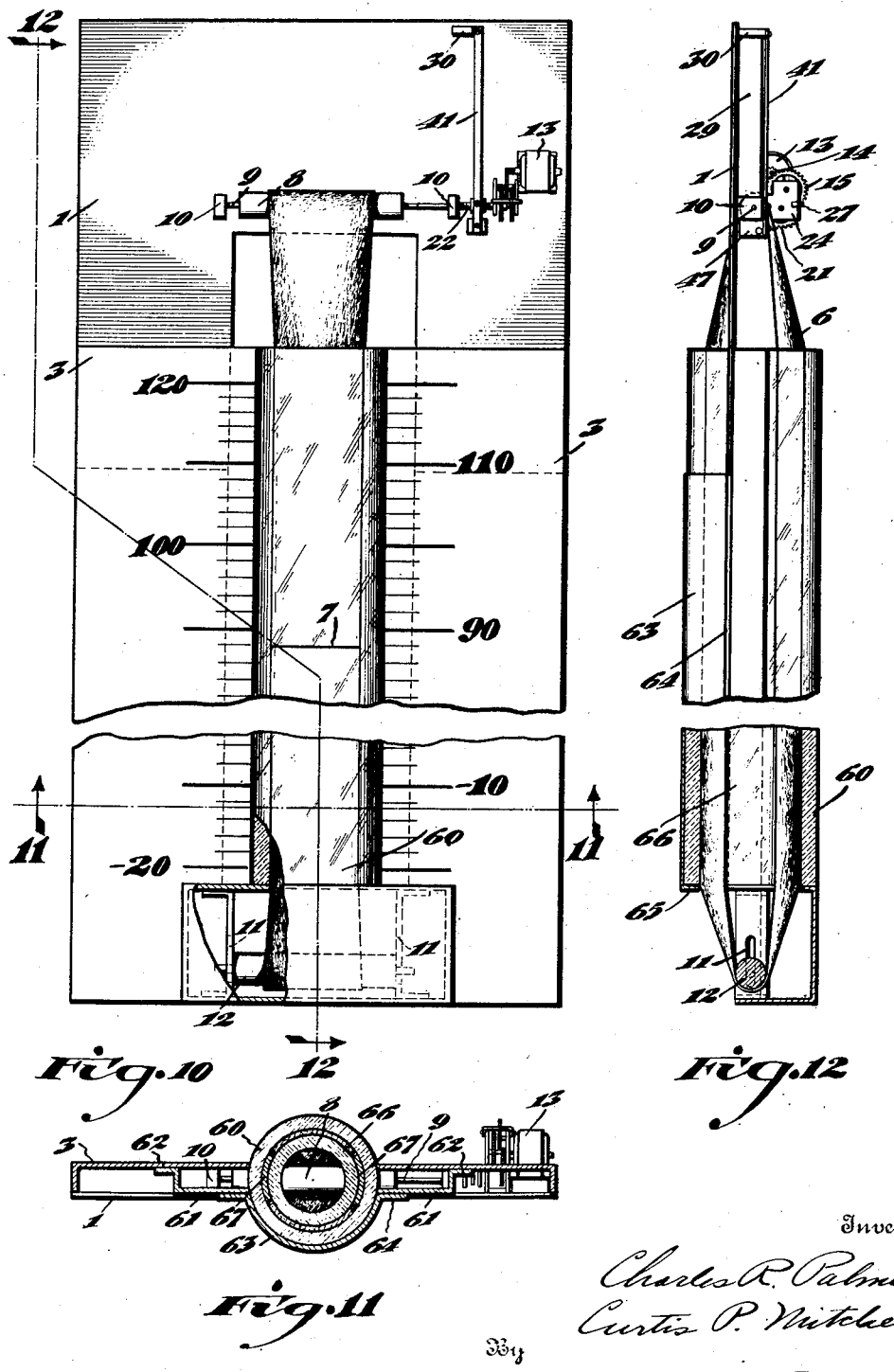

Patented Sept. 6, 1932

1,875,757

UNITED STATES PATENT OFFICE

CHARLES R. PALMER AND CURTIS P. MITCHELL, OF CINCINNATI, OHIO; SAID MITCHELL ASSIGNOR TO SAID PALMER

THERMOMETER

Application filed April 20, 1928. Serial No. 271,585.

This invention relates to a large temperature registering device suitable for use as an advertising or display thermometer. The device may be as large as desired, for instance, anywhere from a few feet to a hundred feet or more in height.

The object of the invention is to produce such a large display temperature registering device which will be very accurate, and sensitive to temperature changes, and which will be visible and legible from a great distance and is operated by relatively small mechanism.

Further objects and advantages will be more fully set forth in a description of the accompanying drawings, forming a part of this specification, in which:

Figure 1 is a front view of the temperature registering device.

Figure 2 is a side elevation thereof.

Figure 3 is a sectional view taken on line 3—3, Figure 1, detailing the construction of the frame at the base, and showing the mounting of the weight roller hung in the lower end of the indicator belt.

Figure 4 is an enlarged fragmentary view of the mechanism for automatically moving and controlling the movement of the temperature indicator.

Figure 5 is an enlarged fragmentary side elevation of the upper end of the device showing the previously mentioned mechanism.

Figure 6 is a sectional view taken on line 6—6, Figure 4, detailing the swinging contact end of the thermostat and the contacts adjacent the swinging end.

Figure 7 is a sectional view taken on line 7—7, Figure 6, detailing the relation of the contact to the swinging thermostat end.

Figure 8 is a wiring diagram of the electrical circuits used in this device.

Figure 9 is a sectional view taken on line 9—9, Figure 5.

Figure 10 is a front elevation partly broken away of a modified form of indicator and temperature scale arrangement.

Figure 11 is a sectional view taken on line 11—11, Figure 10, further detailing this modification.

Figure 12 is a sectional view taken on line 12—12, Figure 10.

This temperature registering device comprises a temperature scale, an indicator movable in relation thereto, a motor for moving the indicator, and a thermostat adapted to control the rotation and counter-rotation of the motor to adjust the indicator on the scale to register the temperature of the environment.

The thermostat comprises a thermally sensitive member adapted to move over a given path responsively to changes in temperature and to occupy a definite position in said path for a definite temperature, and a control member provided with contacts, one on each side of said thermally sensitive member, the control member operatively connected with the motor to be moved by its rotation in the path of travel of the thermally sensitive member, the contacts on the thermally sensitive member being so connected to the motor that the contact of either to the thermally sensitive member revolves the motor in the direction tending to disestablish the contact.

The temperature indicator preferably comprises a flexible endless band mounted upon rollers, one of which is driven by the motor through reduced motion mechanism, and the other of which holds the band taut. The control device bearing the contacts is preferably mounted upon a threaded shaft, forming an extension on the shaft of the driving roll. The exact relationship of these various elements may be varied somewhat, however, to provide correct proportions for the operating mechanism in relation to the size thermometer desired.

More specifically, the temperature registering device comprises a long relatively narrow sheet metal back member 1, disclosed as in a vertical position, provided with forwardly turned flanges 2 against which are disposed front plates 3 which do not meet but have a channel between them. The inner edges of these front plates are supported upon channel irons 4 which extend along their inner edges. The front plates 3 do not extend all the way up the back member, the upper portion of which is utilized as a mounting for the thermostat and associated operating mechanism.

Upon the outer surfaces of the front plates, on either side of the vertically extending channel between them, is a temperature scale 5 on which the temperature of the environment is adapted to be registered by an endless flexible member 6 such as a belt or band which is provided with a line of demarcation 7 which serves as an indicator in relation to the scale. If desired, the portion of the flexible indicator can be white above this index line and red or any other color below to simulate the appearance of a mercury or other type thermometer. This endless flexible member is mounted upon a roller 8 aligned with the channel, said roller secured to a shaft 9 journalled in bearings 10 attached to the back member 1 at a point above the termination of the front plates 3. The channel members which space the front plates from the back are provided near their bottoms with slots 11 in which is disposed a weight roller 12 about which the flexible member passes, so that this weight roller holds the flexible member taut. The belt or band 6 is guided by engagement with the overhanging inner edges 3ª of the plates 3. If desired, springs can be substituted for gravity in order to hold the flexible member taut.

A motor 13 is mounted upon the back member 1. On the end of the motor shaft is a pinion 14 which drives a large gear 15 mounted on the same shaft 16 with a second small pinion 17 which turns a large gear 18 mounted on the same shaft 19 with a small pinion 20 which drives a large gear 21 mounted upon a shaft 22 which is connected to the shaft on which is mounted the upper roller. These shafts are journalled in plates 23 and 24 which are secured to blocks 25 attached to the back member 1 by means of screws 26. A U-shaped brace 27 is secured to these plates at their outer ends to stabilize the construction.

This mechanism is a motion reducing mechanism which provides slow motion of the roller suspending the flexible indicator in comparison to the comparatively rapid rotation of the motor. The portion of the shaft 22 between the reduced motion mechanism and the shaft 9 of the roller is provided with a screw thread of relatively fine pitch as at 28.

A thermally sensitive member 29, comprising two lengths of dissimilar metal joined together, is mounted at one end on a block 30 by means of two plates 31 one on either side of the thermally sensitive member and screws 32 passing through both of said plates and the thermally sensitive member and into the block. This block 30 is attached to the back member 1 in such a position that the other end of the thermally sensitive member extends past the screw threaded portion of the shaft 22, the general extent of the thermally sensitive member being transverse to said shaft or substantially at right angles thereto. A plate 33 of insulating material is secured to this end of the thermally sensitive member by means of a screw 34 and a nut 35. To this plate is secured a contact bearing extension 36 by means of a screw 37 and nut 38. This contact bearing extension is provided with two contacts 39, 40, one on either side thereof, so that a line passing through the centers of said contacts would be, in general, parallel with the axis of the shaft 22.

Pivoted to the block 30 on the outer face thereof is a strap 41 extending substantially parallel to the thermally sensitive member. To this strap is attached a block 42 by means of a screw 43 passing through both members. The screw 43 passes through a slot 43ª disposed longitudinally of the strap 41 (see Figure 6). The block and strap are permitted to move relatively, because of the clearance afforded by the slot as the block moves along the shaft to either side, thereby preventing binding of the block on the screw shaft. This block is screw threaded upon the threaded portion of the shaft 22, so that the rotation of that shaft moves the block along the shaft. On the outer end of this strap is disposed a contact holding member comprising a base plate 45 which is secured to the end of the strap by a screw 46 and two side plates 47 of insulating material which are secured to the base plate by screws 48 and nuts 49. These side plates are disposed one on each side of the contact bearing extension from the thermally sensitive member.

On the insides of these side plates are disposed contacts 50 each of which is adapted to contact one of the contacts on the thermally sensitive member.

These various elements are connected up as disclosed in Figure 7. Since alternating current is more available than direct current the disclosure is made in relation to an alternating current motor.

Two input terminals are provided one of which 51 is connected to a resistance 52, the other end of which is connected by a wire 53 to the contacts at the end of the thermally sensitive member. The other input terminal 54 is connected to the armature 55 of the alternating current motor 13. The other armature terminal of said alternating current motor is connected to both contacts of the member disposed on the end of strap 41. Each connection, however, is made through one field winding 56 or 57 of the alternating current motor, so that the closing of the circuit by reason of one of the contacts 50 on the thermally sensitive member touching either contact carried by the strap closes the circuit through the motor armature and through one of the field windings.

Therefore, when the thermally sensitive member contacts on one side said closing of the circuit revolves the motor in one direction, and contacting on the other side revolves the motor in the reverse direction.

The screw thread of the shaft 22 is so arranged in regard to these connections that the making of contact revolves the motor and moves the block and rod in the direction tending to disestablish said contact and open the circuit.

For the purpose of decreasing the sparking at the contacts two small condensers 58, 59, are disposed between the input terminal 54 and each field winding. These condensers are, in other words, each connected in parallel with the motor armature.

A second form of this device is shown in Figures 10, 11 and 12. The operating mechanism is similar in all respects to that used in the first form. The difference lies in the fact that the temperature registering portion of the device is made to simulate in appearance the ordinary tubular thermometer. A glass tube 60 is located in the channel between the front plates 3 and is held in such position disposed between the front plates and back members, or rather between the front plates and a pair of Z-shaped members, which have their flanges 62 attached to the front plates. A semi-circular element 63 having flanges 64 at each side thereof, surrounds the back of the tube and has its flanges secured to the respective Z-shaped members 61. This element extends from the back 1 to the base of the tube and has an inturned flange 65 engaging the lower end of the tube as a support therefor.

Inside of the first tube is a second tube 66 which is held in position by wedging members 67, one disposed on each side of the tube substantially in alignment with the support for the tube, that is, the backing 1 and the front plates, so that the wedging members do not obtrude upon the passageway between the two tubes at the front of the device or at the back. The belt or flexible endless member which was used in the form first disclosed is also used in this form and is run through the spaces between the two tubes at the front and back of the device, the tubes shaping said flexible member to a convex form to simulate more closely in appearance an ordinary thermometer.

In operation the thermally sensitive member assumes a given position for a given temperature of the environment. If the indicator on the flexible member is not in a corresponding position to register this temperature one of the contacts 50 is touched by one of the contacts 39, 40, on the end of the thermally sensitive member which starts the motor, operates the reduced motion mechanism, turns the roller, and adjusts the indicator to the appropriate position on the scale to provide a reading corresponding to the correct temperature.

This rotation of the motor also moves the strap 41 and the contact is disestablished and the circuit broken when the indicator has reached the proper position. If the temperature continues to change in the same direction the thermally sensitive member moves, re-establishes the contact and operates the motor to move the indicator and disestablish the contact. If the temperature changes in the opposite direction, the thermally sensitive member moves backwardly, touches the other contact, and operates the motor in the reverse direction to move the indicator in the reverse direction, and again the contact is broken when the indicator gives the proper reading on the scale.

In this way, a relatively small and simple device is used to operate a very large temperature registering device which may be made so as to be visible for a great distance, and is adapted for advertising or display purposes such as, for instance, as a substitute for clocks in front of banks, or upon the tops of buildings.

Having described our inventon, we claim:

1. A temperature registering device, comprising, a thermally sensitive member adapted to move over a given path responsively to changes in temperature and to occupy a definite position in said path for a definite temperature, a member bearing a temperature scale, a temperature indicator movable in relation to said scale, a motor adapted to move said indicator, and a control member provided with contacts, one on each side of said thermally sensitive member, said control member operatively connected with said motor to be moved by its rotation in the path of travel of the thermally sensitive member, said contacts on said member so connected to said motor that the contact of either with the thermally sensitive member revolves the motor in the direction tending to disestablish said contact.

2. A large temperature registering device, comprising, a member bearing a temperature scale, a flexible temperature indicator movable in relation thereto, a roller supporting said indicator, a motor adapted to turn said roller and move said indicator, and a thermostat adapted to control the rotation and counter-rotation of said motor to adjust the indicator on said scale to register the temperature of the environment.

3. A large temperature registering device, comprising, a thermally sensitive member adapted to move over a given path responsively to changes in temperature and to occupy a definite position in said path for a definite temperature, a member bearing a temperature scale, a flexible temperature indicator movable in relation to said scale, a roller supporting said indicator, a motor adapted to turn said roller and move said indicator, and a control member provided with contacts, one on each side of said thermally sensitive member, said control member operatively connected with said motor to be moved by its rotation in the path of travel of the thermally sensitive member, said contacts on said member so connected to said motor that the contact of either with the thermally sensitive member revolves the motor in the direction tending to disestablish said contact.

4. A large temperature registering device, comprising, a member bearing a temperature scale, a flexible temperature indicator movable in relation thereto, a roller pendently supporting said indicator, a motor, reduced motion mechanism operatively connecting said motor and said roller, and a thermostat adapted to control the rotation and counter-rotation of said motor to adjust the indicator on said scale to register the temperature of the environment.

5. A large temperature registering device, comprising, a thermally sensitive member adapted to move over a given path responsively to changes in temperature and to occupy a definite position in said path for a definite temperature, a member bearing a temperature scale, a flexible temperature indicator movable in relation to said scale, a roller pendently supporting said indicator, a motor, reduced motion mechanism operatively connecting said motor and roller, and a control member provided with contacts, one on each side of said thermally sensitive member, said control member operatively connected with said roller to be moved by the rotation of the motor in the path of travel of the thermally sensitive member, said contacts on said member so connected to said motor that the contact of either with the thermally sensitive member revolves the motor in the direction tending to disestablish said contact.

6. A large temperature registering device, comprising, a member bearing a temperature scale, a flexible belt marked to serve as a temperature indicator, a roller pendently supporting said indicator, a weighted roller at the lower loop of said belt holding the same taut, a motor adapted to turn said roller and move said indicator, and a thermostat adapted to control the rotation and counter-rotation of said motor to adjust the indicator on said scale to register the temperature of the environment.

7. A large temperature registering device, comprising, a thermally sensitive member adapted to move over a given path responsively to changes in temperature and to occupy a definite position in said path for a definite temperature, a member bearing a temperature scale, an endless flexible temperature indicator movable in relation to said scale, a roller pendently supporting said indicator, a roller at the lower loop of said indicator, said roller adapted to hold said indicator taut, a motor adapted to turn said supporting roller and move said indicator, an a control member provided with contacts, one on each side of said thermally sensitive member, said control member operatively connected with said motor to be moved by its rotation in the path of travel of the thermally sensitive member, said contacts on said member so connected to said motor that the contact of either with the thermally sensitive member revolves the motor in the direction tending to disestablish said contact.

8. A large temperature registering device, comprising, a member bearing a temperature scale, an endless flexible temperature indicator movable in relation thereto, a roller pendently supporting said indicator, a roller at the lower loop of said indicator to hold the same taut, a motor, reduced motion mechanism connecting said motor and said roller, and a thermostat adapted to control the rotation and counter-rotation of said motor to adjust the indicator on said scale to register the temperature of the environment.

9. A large temperature registering device, comprising, a thermally sensitive member adapted to move over a given path responsively to changes in temperature and to occupy a definite position in said path for a definite temperature, a member bearing a temperature scale, a flexible belt marked to indicate temperature in relation to said scale, a roller pendently supporting said belt, means for holding said belt taut, a motor, a screw threaded shaft rotatively connected with said motor, reduced motion mechanism connecting said screw threaded shaft and motor, and a control member provided with contacts, one on each side of said thermally sensitive member, said control member translatably connecting with the screw portion of said screw threaded shaft so as to be moved by the rotation of the motor in the path of travel of the thermally sensitive member, said contacts on said member so connected to said motor that the contact of either with the thermally sensitive member revolves the motor in the direction tending to disestablish said contact.

10. A temperature indicating device, comprising, an indicator movable in opposite directions, an electric motor, a transmission connecting said electric motor to said indicator, a thermally sensitive member, electric motor circuit controlling switch elements, relatively movable for motor circuit and direction control, one of said switch elements movable by said thermally sensitive member for engagement with the second switch element for motor starting control, and a transmission connecting the motor and the other switch element for actuating said other switch element and disengaging the switch elements for motor stopping control.

11. A temperature indicating device, comprising, an indicator, an electric motor, a transmission connecting said electric motor to said indicator, a thermally sensitive member, electric motor circuit control switch elements relatively movable for electric motor circuit control, one movable by said thermally sensitive member and the second movable by said motor for making and breaking the circuit to the motor.

In witness whereof, we hereunto subscribe our names.

CHARLES R. PALMER.
CURTIS P. MITCHELL.